(12) United States Patent
Hare et al.

(10) Patent No.: US 10,065,526 B2
(45) Date of Patent: Sep. 4, 2018

(54) DYNAMIC POWER LIMIT ADJUSTMENT IN A BATTERY CHARGING PROCESS

(71) Applicant: GM GLOBAL TECHNOLOGY OPERATIONS LLC, Detroit, MI (US)

(72) Inventors: William M. Hare, Farmington Hills, MI (US); Michael A. Assenmacher, Highland, MI (US); Nicholas J. Hainer, Howell, MI (US); Christopher J. Twarog, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 15/239,413

(22) Filed: Aug. 17, 2016

(65) Prior Publication Data

US 2018/0050604 A1 Feb. 22, 2018

(51) Int. Cl.
*H02J 7/04* (2006.01)
*B60L 11/18* (2006.01)

(52) U.S. Cl.
CPC ....... *B60L 11/1872* (2013.01); *B60L 11/1816* (2013.01); *B60L 11/1844* (2013.01); *B60L 11/1862* (2013.01); *B60L 11/1864* (2013.01)

(58) Field of Classification Search
USPC ........................................................ 320/150
See application file for complete search history.

(56) References Cited

U.S. PATENT DOCUMENTS

2013/0320923 A1* 12/2013 Hooker ................. B60L 3/0046
320/109
2015/0314690 A1* 11/2015 Buia ..................... B60L 11/184
320/157

* cited by examiner

*Primary Examiner* — Robert Grant
(74) *Attorney, Agent, or Firm* — Quinn IP Law

(57) ABSTRACT

An electrical system is usable with an offboard charging station and configured to dynamically adjust a power limit of the electrical system during a battery charging process. The system includes a battery pack, charge coupler, power electronic components, temperature sensor(s), and a controller. The components include a most-limiting component, and are electrically connected to the battery pack with corresponding temperature-based operating performance information. The information describes a maximum allowed charging current over different time intervals. The most-limiting component has a lowest allowed charging current. The controller executes a method by determining a component temperature using the measured temperature(s), and requests increased charging current from the power supply over one or more of the time intervals to supply the battery pack with the maximum allowed charging current of the most-limiting component. A vehicle includes the system and an electric machine delivering torque sufficient for propelling the vehicle.

18 Claims, 3 Drawing Sheets

DYNAMIC POWER LIMIT ADJUSTMENT IN A BATTERY CHARGING PROCESS

TECHNICAL FIELD

The present disclosure relates to a method and system for dynamically adjusting power limits in a battery charging process.

BACKGROUND

An electric powertrain typically includes one or more high-voltage electric machines. Each electric machine is powered by a high-voltage battery pack or other suitable direct current (DC) device. In some configurations, a power inverter receives a DC output voltage from the battery pack and generates an alternating current (AC) voltage suitable for energizing the phase windings of the electric machines. The battery pack may be recharged as needed by connecting a charge coupler to a wall outlet, charging station, or other available offboard power supply via an electrical cable.

An AC-DC converter is used to convert an AC charging voltage into a DC output voltage suitable for storage in the various cells of the battery pack. Alternatively, a DC fast-charging system, also known as DC Quick Charger (DCQC), may be used to expedite the charging process. In such a configuration, the AC-DC converter is eliminated in favor of a junction box having high-voltage relays that close during charging to enable a charging current to pass from the charge coupler to the battery pack. Communication between the charging station/charging infrastructure and any electrical system-side charging equipment is achieved via a charging protocol, e.g., SAE J1772 in an example electric vehicle charging operation.

High-voltage charging architectures in vehicles and other systems typically include a number of power electronic components such as charge couplers, receptacles, electrical connectors, contactors, relays, fuses, and voltage bus bars. As is well known in the art, such components are typically current-limited or voltage-limited by the manufacturer to a particular temperature-based level. For each component, a corresponding steady-state charging current may be maintained indefinitely at a given component temperature. The power limit that is enforced during the battery charging process is typically controlled to the lowest steady-state limit of the various components of the electrical system.

SUMMARY

Disclosed herein are methods and related systems for improving a charging speed of a battery pack or other rechargeable energy storage system in an electrical system, e.g., an electric powertrain of a vehicle, robot, or other mobile platform, or in a stationary system such as a power plant, appliance, or other battery-powered electronic device. The present approach is usable with any offboard power supply, whether embodied as an alternating current (AC) charging station or as a direct current (DC) Quick Charger (DCQC) of the types described generally above. The approach described herein take advantage of any unused potential in the overall electrical system to dynamically increase power limits during early stages of a battery charging process, with the overall goal of reducing charging times relative to conventional charging methods.

As noted above, battery charging processes in high-voltage electrical systems are typically limited to the lowest steady-state charging current of the various components used in the electrical system. However, as part of the present disclosure it is recognized that such components can handle higher charging currents over short durations. As a result, control of the battery charging process to the lowest steady-state component power limit is not always required. Selective enabling of higher temporary power limits as disclosed herein can therefore be achieved while at all times remaining within calibrated durability ratings of the power electronic components used in the electrical system.

Power transferred through the power electronic components is closely monitored via an onboard controller as part of the present method. When the temporarily enforced higher power limits are reached, e.g., as determined in terms of threshold current density, time, and/or component temperature, the requested charging current from the offboard power supply is automatically decreased. Decreasing of the charging current may occur in one or more discrete steps or at a calibrated ramp rate, and continues to a lower level, e.g., the steady-state limit of the most-limiting of the components. As defined herein, the most-limiting component is the particular component having the lowest-permitted charging current for a given component temperature. In turn, this allows the battery pack to temporarily charge at a faster relative rate, particularly at the onset or early stages of a charging session, thereby further reducing charging times relative to conventional steady-state battery charging processes.

In an example embodiment, the electrical system includes a battery pack, a charge coupler, power electronic components, one or more temperature sensors, and a controller. The charge coupler connects to the offboard charging station via a cable to permit a requested charging current to pass from the offboard charging station to the cells of the battery pack.

The power electronic components, including a most-limiting component, are electrically connected to the battery pack. The controller is programmed with temperature-based operating performance information for each component of the system, with such information describing a maximum allowed charging current, voltage, or power over a plurality of different time intervals. The most-limiting component has the lowest allowed charging current over a respective one of the time intervals. The controller determines component temperatures using the measured temperature(s), and then requests a temporarily increased charging current from the offboard power supply over at least one of the time intervals to supply the charging current at a temporarily higher level equal to the maximum current permitted by the most-limiting component.

A vehicle is also disclosed that is electrically connectable to an offboard charging station during a battery charging process. The vehicle includes an electric machine operable for delivering torque to a rotatable output member sufficient for propelling the vehicle, and the electrical system noted above.

A method is also disclosed, which in an example embodiment includes measuring an ambient temperature and a temperature of a charge coupler using respective first and second temperature sensors, with the charge coupler electrically connecting the electrical system to an offboard charging station via a length of cable. The method includes determining a respective component temperature for each of a plurality of power electronic components of the electrical system using the measured temperatures.

Additionally, the method includes requesting, via a controller for a calibrated duration at an onset of the battery charging process, a charging current from the offboard power supply that is equal to a maximum allowed charging current of a most-limiting one of the components, wherein the most-limiting component has a lowest allowed charging current over the time interval. After a calibrated duration, temperature, or accumulated charging current, a reduction of the charging current is requested from the offboard power supply to a steady-state charging current of the most-limiting component.

The above features and advantages and other features and advantages of the present disclosure are readily apparent from the following detailed description of the best modes for carrying out the disclosure when taken in connection with the accompanying drawings.

DETAILED DESCRIPTION

Figure 1:
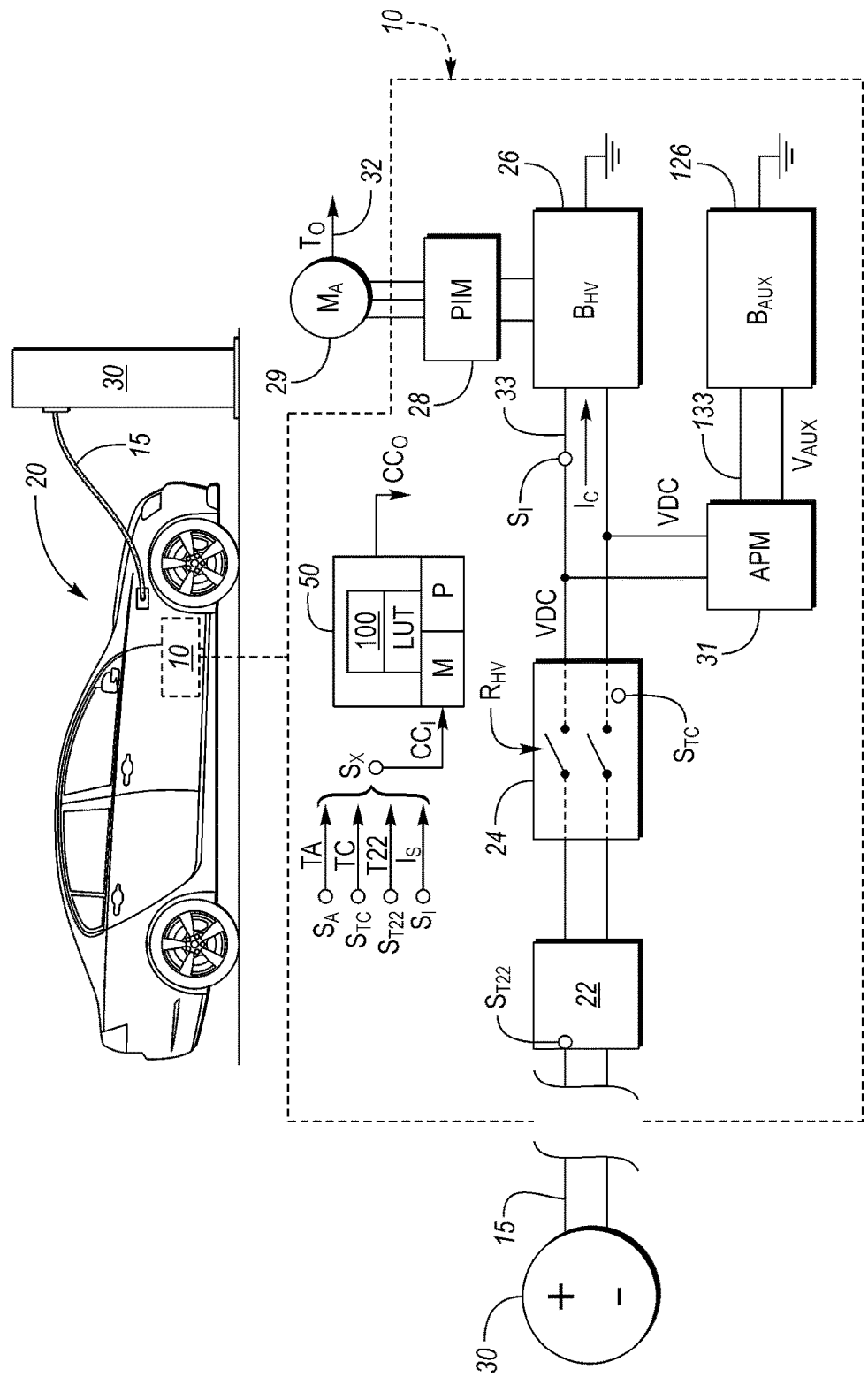
FIG. 1 is a schematic illustration of an example electrical system connected to an offboard power supply during a representative charging session.

Referring to the drawings, wherein like reference numbers refer to the same or like components in the several Figures, as shown schematically in FIG. 1, an electrical system 10 is electrically connected to an offboard charging station 30 via a charge coupler 22 and a length of electrical cable 15. As is well known in the art, the charge coupler 22 is a plug or receptacle that is configured to connect to a mating end of the electrical cable 15 to permit a requested charging current (arrow $I_C$) from the offboard charging station 30 to be fed into the electrical system 10 during a battery charging process.

The offboard charging station 30 may be used with any stationary or mobile electrical system 10, e.g., aboard an example vehicle 20 as shown or any other electrified powertrain or other system having a rechargeable energy storage system, shown in FIG. 1 as a high-voltage battery pack ($B_{HV}$) 26. The battery pack 26 may be variously embodied as a multi-cell/multi-module battery pack, such as but not limited to a lithium ion, zinc-air, nickel-metal hydride, or lead acid DC battery pack. The battery pack 26 can be recharged as needed using the charging current (arrow $I_C$) delivered by the offboard charging station 30. In some embodiments, the battery pack 26 may also be recharged during ongoing operation, for instance via regenerative braking when the electrical system 10 is used as part of the vehicle 20.

As will be described in detail below with reference to FIGS. 2-4, the present disclosure enables a controller 50 to dynamically and temporarily exceed steady-state component hardware power limits of the electrical system 10 during a battery charging process, with the attendant benefit of reducing overall charging times. Example high-voltage power electronic components may include charging receptacles, such as the charge coupler 22, or electrical connectors such as relays or contactors, e.g., a pair of high-voltage contactors $R_{HV}$, service disconnect devices, fuses, high-voltage rails or bus bars 33, or other power electronic components of the type known in the art.

Each power electronic component is electrically connected to the battery pack 26 as shown. Additionally, each such component is typically rated, for various temperatures or temperature bands, at a particular power, voltage, or current limit over a corresponding duration. The power limit variation of each component over different temperature bands may be captured in a lookup table (LUT) or multiple LUTs, whether data-based or graphical in the form of calibrated temperature-based operating performance information, or such variation may be modeled. Thus, each power electronic component of the electrical system 10 has corresponding temperature-based operating performance information describing a maximum allowed value, e.g., charging current, over a plurality of different time intervals. FIG. 3 as discussed below depicts an example temperature-based operating performance curve for a representative power electronic component, with the information contained therein readily represented as the above-mentioned temperature-based operating performance information.

Power electronic components also have a corresponding steady-state power limit, defined as a lower relative power limit having a level that can be effectively maintained over long periods of time without resulting in significant degradation of component integrity or functionality. The controller 50 of FIG. 1, in executing instructions embodying a method 100 as depicted in FIG. 4, thus allows for higher temporary power limits to be requested and enforced when charging the battery pack 26 while still remaining within calibrated durability ratings. At all times, control is provided to a level required by a most-limiting one of the various components, i.e., of the particular component having the lowest allowed charging current over a given one of the various time intervals.

With continued referenced to FIG. 1, the electric potential of the battery pack 26 may range from about 60 VDC-360 VDC or more depending on the particular configuration and power output requirements. For the purposes of the present disclosure, the term "high-voltage" refers to any voltage level exceeding a typical 12-15 VDC auxiliary voltage. Thus, the term "low-voltage" refers to voltage levels below such high-voltage levels. While the present approach is particularly beneficial when applied to high-voltage components, those of ordinary skill in the art will appreciate that the present teachings may be readily applied to low-voltage components within the intended scope of the disclosure.

The battery pack 26 may be used to energize one or more electric machines (M1) 29 via a power inverter module (PIM) 28 such that each electric machine 29 ultimately produces output torque (arrow $T_O$) via a corresponding output member 32, e.g., to propel the vehicle 20 or perform other useful work. Auxiliary power may be supplied via an auxiliary battery ($B_{AUX}$) 126 providing an auxiliary voltage $V_{AUX}$, typically 12 VDC. The auxiliary battery 126 in turn may be energized via an auxiliary power module (APM) 31 embodied as a voltage regulator operable for reducing the DC voltage from a level output from the battery pack 26. The APM 31 and/or the auxiliary battery 126 may serve as auxiliary power supplies connected to auxiliary voltage bus bars 133 within the scope of the present disclosure.

When the offboard charging station 30 is a DC power supply, such as a DCQC station, a junction box 24 having the high-voltage contactors $R_{HV}$ may be used to enable rapid power disconnection when necessary, e.g., during each commanded shut-down or key-off event of the vehicle 20.

Thus, DC charging power may be delivered directly to the DC voltage bus bars 33 and/or the battery pack 26 in such a configuration. When the offboard charging station 30 is an AC charging station, the junction box 24 may be replaced with an AC-DC converter of the type known in the art, i.e., a power conversion device containing banks of semiconductor switches, diodes, signal filters, and other hardware for inverting an AC input voltage or current waveform to form a DC voltage or current waveform. Similar structure is used to allow the PIM 28 to work in the opposite manner, i.e., to change a DC voltage that is output from the battery pack 26 into an AC voltage suitable for powering the electric machine 29.

The controller 50 of FIG. 1 is programmed to receive input signals (arrow $CC_I$) from a set of sensors $S_X$. In response to the input signals (arrow $CC_I$), the controller 50 controls the overall charging operation of the battery pack 26 via output signals (arrow $CC_O$), which in turn are transmitted as power requests to a control circuit (not shown) of the offboard charging station 30, for instance as part of the SAE-J1772 standard noted above or another applicable charging protocol. The identity and range of the input signals (arrow $CC_I$) may vary with the particular application.

Within the scope of the present disclosure, the sensors $S_X$ include a current sensor ($S_I$), e.g., an ammeter, configured to measure an amplitude and sign/direction of the charging current (arrow $I_C$) entering the battery pack 26, and one or more temperature sensors operable for ultimately determining a component temperature. For instance, an ambient temperature sensor ($S_A$) may be used that is operable for measuring an ambient temperature (arrow TA), i.e., a temperature of the environment outside of and proximate to the electrical system 10. A coupler temperature sensor ($S_{T22}$) located at or near conductive pins (not shown) of the charge coupler 22 may be used to measure a coupler temperature (arrow T22). In other embodiments, the sensors $S_X$ may include individual component temperature sensors ($S_{TC}$) located on or within the various power electronic components and used to directly measure a corresponding component temperature (arrow TC), with an example location on or within the junction box 24 as shown in FIG. 1.

The controller 50 includes a processor (P) and memory (M). The memory (M) includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 may be programmed with a lookup tables (LUT) or multiple such lookup tables as set forth below, and to execute instructions embodying the method 100 in order to dynamically adjust the charging power limit during a charging session.

As will be explained below, the controller 50 is in communication with the sensors $S_X$, and is programmed with the temperature-based operating performance data for the various power electronic components of the electrical system 10. The controller 50 is configured to ultimately determine the component temperature using the measured temperature(s), and to request a temporarily increased charging current (arrow $I_C$) from the offboard power supply 30 over the course of one or more time intervals. This enables the controller 50 to ensure that the battery pack 26 is supplied with the maximum allowed charging current of the most-limiting component during a particular time interval.

Figure 2:
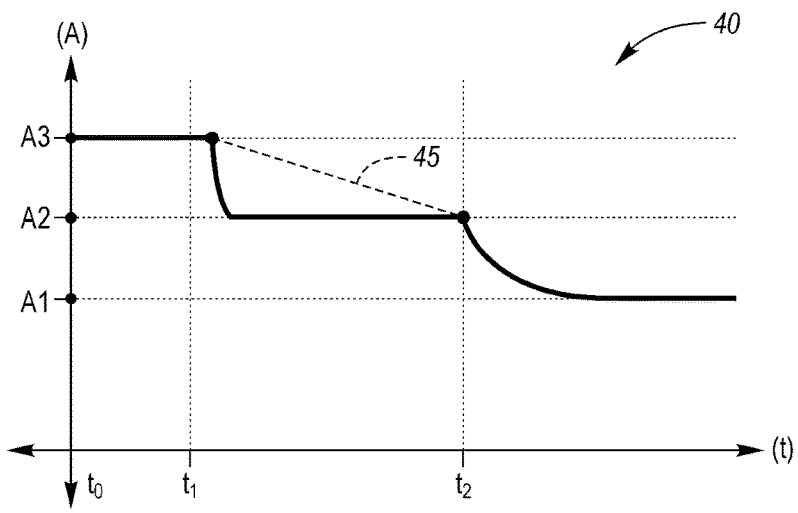
FIG. 2 is an example dynamic charging profile depicting amplitude of an applied charging current on the vertical axis and time on the horizontal axis.

FIG. 2 depicts a representative charging plot 40 showing the dynamic effects of the present method 100 on charging current amplitude, depicted as amps (A) on the vertical axis, over time (t) as represented on the horizontal axis. With charging of the battery pack 26 of FIG. 1 commencing at to, the controller 50 temporarily requests an increased charging current from the offboard charging station 30 of FIG. 1, e.g., via wireless or hardwired messaging, to a higher relative level A3. Level A3 corresponds to a higher short-term power limit of the most limiting of all of the power electronic components used in the electrical system 10 and subjected to charging power during the charging process.

The controller 50, having detected at $t_1$ that a calibrated threshold component or other temperature, charging time, or accumulated charging current has been reached, automatically reduces the requested charging current from the higher level (A3) to a lower relative level (A2). The lower relative level (A2) may be a calibrated steady-state charging current of the most-limiting of the power electronic components for a given component temperature as explained below, in which case the requested charging current from the offboard charging station 30 is reduced from level A3 to level A2 at $t_1$, e.g., as a discrete step reduction as shown. Alternatively, the controller 50 may gradually reduce the charging current at a calibrated ramp rate 45, such as by calculating the maximum charging power needed for the most limiting component and requesting this particular value for another interval, i.e., $t_1$ to $t_2$.

This process may be repeated until a threshold charging time, accumulated current, or state of charge is reached, as represented in FIG. 2 by $t_2$, at which point the controller 50 of FIG. 1 again requests reduction in the charging current to a lowest relative level (A1) to finish the charging process and balance cell voltages at a slower relative charging rate, as is well known in the art. For instance, by $t_2$ the battery pack 26 should have reached approximately 80-90% of its maximum charge, either in terms of individual cell voltages or a pack voltage across the battery pack 26 as a whole. From $t_2$ until the end of the battery charging process, the charging current (arrow $I_C$) is maintained at the lowest relative level (A1).

Figure 4:
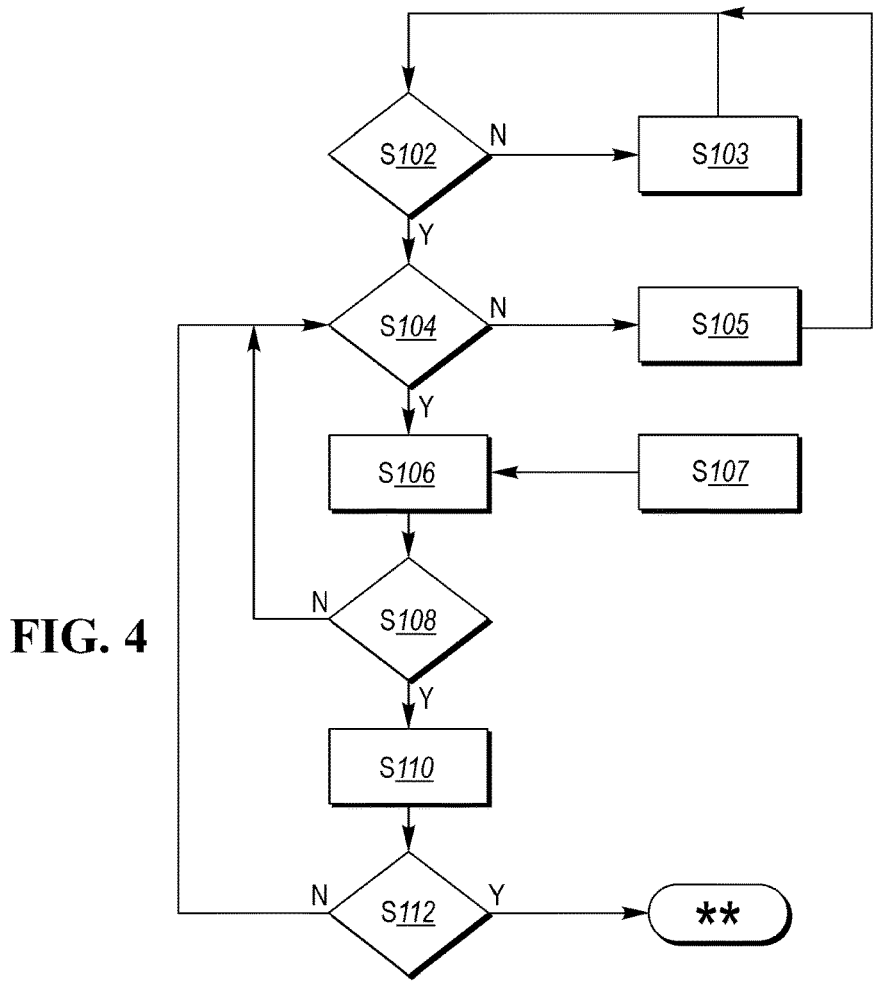
FIG. 4 is a flow chart describing an example method for dynamically increasing power limits during a charging session of the electrical system shown in FIG. 1.

Referring to FIG. 4, the method 100 is embodied as computer-readable and executable instructions of the controller 50. Execution of method 100 causes the controller 50 to dynamically adjust a power limit of the electrical system 10 as described above. In a general embodiment, the method 100 includes measuring ambient temperature (arrow TA) and a temperature (arrow T22) of the charge coupler 22, and then determining a respective component temperature (arrow TC) for each power electronic component using the measured ambient and charge coupler temperatures.

The method 100 also requires requesting, via the controller 50 for a calibrated duration at an onset of the battery charging process, a charging current (arrow $I_C$) from the offboard power supply 30 at a level that is equal to a maximum allowed charging current of a most-limiting one of the components as explained above. After a calibrated duration, temperature, or accumulated charging current has been detected, the method 100 proceeds by requesting reduction of the charging current (arrow $I_C$) from the offboard power supply 30 to a steady-state charging current of the most-limiting component or other suitable lower level.

Another example embodiment of the method 100 is shown in FIG. 4, and commences with step S102. In this embodiment, the controller 50 of FIG. 1 determines whether a predetermined set of entry conditions is satisfied. As part of step S102, the controller 50 determines whether the battery pack 26 is actively charging. For example, step S102 may entail determining if the charging current (arrow $I_C$) is being directed into the battery pack 26, e.g., by measuring the charging current (arrow $I_C$) flowing into the battery pack 26 using the current sensor $S_I$ shown schematically in FIG. 1.

In a vehicle charging application in particular, a charging protocol such as SAE-J1772 requires communication between the controller 50 and the offboard charging station 30, and thus the status of the charging current (arrow $I_C$) from the offboard charging station 30 may also be used as part of step S102 to help determine whether or not the battery pack 26 is actively charging. The method 100 proceeds to step S103 if the battery pack 26 is not actively charging, and to step S104 in the alternative if the battery pack 26 is actively charging.

Step S103, which is executed when the battery pack 26 is not actively charging, may include initiating a time-based and/or temperature-based cool-down period in which the controller 50 of FIG. 1 temporarily disables a repeat execution of the method 100. For instance, the controller 50 may require that all power electronic components used in the electrical system 10 first reach a set temperature, or cool down for a set duration, or both, before again allowing the method 100 to be executed by the controller 50. The method 100 then returns to step S102.

Step S104 is reached after determining at step S102 that the battery pack 26 is actively charging and, at step S103, that a calibrated cool-down period is complete. Step S104 includes determining if a charging current requested by the controller 50 exceeds a steady-state component threshold or another calibrated threshold. If so, the method 100 proceeds to step S106. If the requested charging current (arrow $I_C$) is less than the particular component threshold, the method 100 proceeds in the alternative to step S105.

As part of step S104, the controller 50 may access the lookup tables (LUT) for each component in the electrical system 10, measure the respective ambient and coupler temperatures (arrows TA and T22), and calculate or estimate the temperatures of the various components. Step S104 may alternatively include directly measuring the component temperature(s) (arrow TC) as noted above. Using the calculated, estimated, or measured component temperatures, the controller 50 may select the appropriate temperature-based charging power limit to apply for all of the components in the electrical system 10, and then select the most limiting power limits, i.e., the particular component power limit having the lowest maximum charging current for a given temperature. The controller 50 then compares to the calibrated steady-state power limit, e.g., contained in another lookup table (LUT), in order to make the determination required by step S104.

Figure 3:
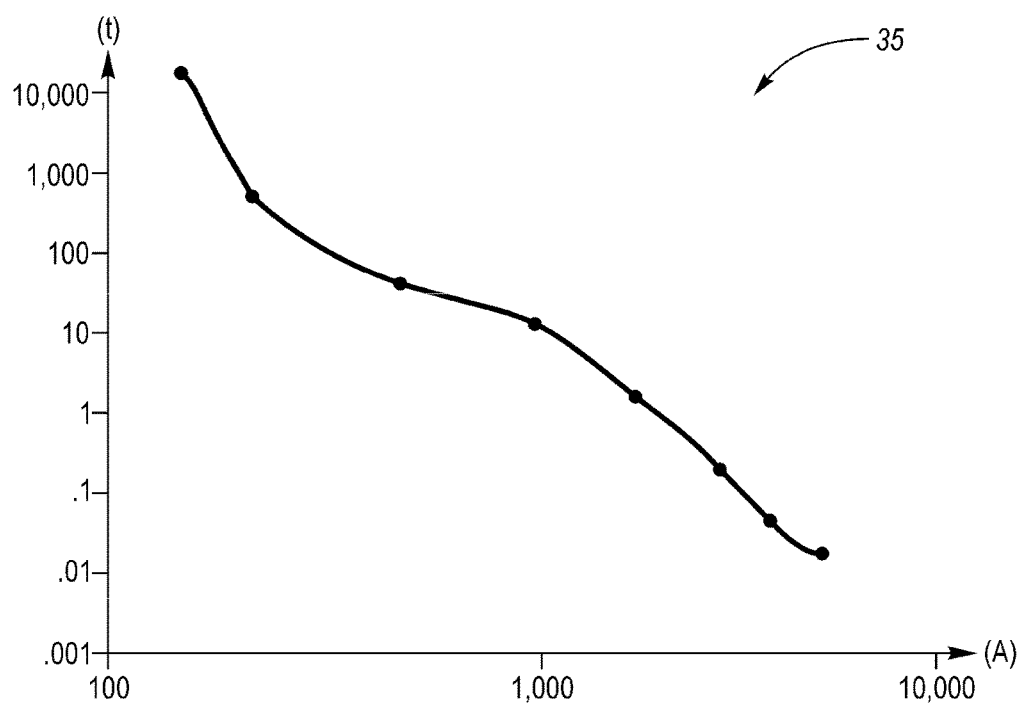
FIG. 3 is an example temperature-based operating performance curve for a representative power electronic component.

An example of such limits is shown in FIG. 3 as a temperature-based operating performance curve 35 for a representative power electronic component. As depicted, the example component may take a lower charging current, depicted in amps (A) on the horizontal axis. As the charging current (arrow $I_C$) increases, however, the time the component is subjected to the increased charging current (arrow $I_C$) decreases. Each component used in the electrical system 10 has a corresponding set of such performance curves 35 or information for various temperatures, recordable in a lookup table in some embodiments, such that the controller 50 can select the most-limiting charging current (arrow $I_C$).

In one possible embodiment, an internal resistance of each component may be determined offline, such that the ambient/outside temperature may be measured along with a temperature at the charge coupler 22, e.g., via a thermistor connected proximate any charging pins (not shown) of the charge coupler 22, and the temperature of the component thereafter calculated or estimated using these measured temperatures and the known internal resistance values.

At step S105, having determined at step S104 that the controller 50 has requested a charging current (arrow $I_C$) below the steady-state or other lower limit, the controller 50 next controls the charging process to the power limit defined by the battery pack 26. In other words, since the requested charging current (arrow $I_C$) is already less than the steady-state limit or other lower limit, the controller 50 may freely charge the battery pack 26 in the conventional manner without resorting to the dynamic adjustment of power limits of subsequent steps of method 100. The method 100 then repeats step S102.

At step S106, the controller 50 receives data from step S107 while charging the battery pack 26 at the highest component-permitted level. That is, referring briefly to FIG. 2, the controller 50 temporarily increases the charging current (arrow $I_C$) to the maximum power limit of the most limiting of the power electronic components, i.e., the higher relative level (A3) of FIG. 2, and then begins the process of determining when conditions from step S107 are proper for reducing the charging current (arrow $I_C$) to the steady-state or other lower relative level (A2).

As part of step S106, the controller 50 of FIG. 1 may accumulate the charging current (arrow $I_C$), i.e., calculate a total amount of charge energy passing to the battery pack 26 beginning at to in FIG. 2, and/or may initiate a charging timer in logic to determine how long charging at the higher relative level (A3) has continued, and/or may continue to determine the individual temperatures of the various power electronic components as set forth above, i.e., either by modeling, estimation, or direct measurement in different embodiments. Thus, in different embodiments, the passage of a calibrated duration, or the attaining of a calibrated temperature, or the reaching of a threshold accumulated charging current may be used as part of step S106. The method 100 then proceeds to step S108.

Step S107 includes measuring the atmospheric temperature (arrow TA), the charging current (arrow $I_C$), and the coupler temperature (arrow T22) and relaying these values to the controller 50 of FIG. 1. Alternatively, the component temperature (arrow TC) may be individually and directly measured, albeit at the cost of individual thermistors or other sensors with each component.

Step S108 includes determining whether the charging current/power limit of the most limiting of the power electronic components of FIG. 1 has been reached. If so, the controller 50 proceeds to step S110. The controller 50 otherwise repeats step S104.

At step S110, the controller 50 decreases the charging current requested from the offboard charging station 30 of FIG. 1 to the lower relative level (A2) shown in FIG. 2, i.e., via communication with the offboard charging station 30 as set forth above. As noted above, the lower relative level (A2) may be the steady-state power limit of the most-limiting of the components in some embodiments, or the individual short-term higher power limits may be reevaluated and applied as set forth above through the duration $t_1$ to $t_2$ such that the calibrated ramp 45 of FIG. 2 is followed, or a series of discrete step adjustments are followed as shown, until reaching $t_3$. At $t_3$, step S110 includes further reducing the charging current (arrow $I_C$) such that the charging process tails off or proceeds more slowly so as to ensure proper cell balancing and charge completion, as is known in the art. The method 100 then proceeds to step S112.

At step S112, the controller 50 determines whether charging of the battery pack 26 is complete, e.g., by comparing state of charge or cell voltages or battery voltage to a calibrated threshold. The method 100 is complete (\*\*) when the charging process is complete, with the method 100 resuming anew with step S102. If not, the controller 50 repeats step S104.

While the best modes for carrying out the disclosure have been described in detail, those familiar with the art to which this disclosure relates will recognize various alternative designs and embodiments for practicing the disclosure within the scope of the appended claims.

The invention claimed is:

1. An electrical system for use with an offboard charging station and configured to dynamically adjust a power limit of the electrical system during a battery charging process, the electrical system comprising:
    a battery pack;
    a charge coupler configured to connect the electrical system to the offboard charging station via a cable and permit a requested charging current to pass from the offboard charging station to the battery pack during the battery charging process;
    a plurality of power electronic components including a most-limiting component, wherein the components are electrically connected to the battery pack and have corresponding temperature-based operating performance information describing a maximum allowed charging current over a plurality of different time intervals, wherein the most-limiting component has a lowest allowed charging current over a respective one of the time intervals;
    at least one sensor operable for measuring a temperature; and
    a controller in communication with the at least one temperature sensor and programmed with the temperature-based operating performance data for the power electronic components for a plurality of different component temperatures, wherein the controller is configured to determine the component temperature using the measured temperature, and to request a temporarily increased charging current from the offboard power supply over at least one of the time intervals to thereby supply the battery pack with the maximum allowed charging current of the most-limiting component during the respective time interval.

2. The electrical system of claim 1, wherein each of the power electronic components has a corresponding steady-state charging current that is less than the maximum allowable charging current, and wherein the controller is configured to request the steady-state charging current of the most-limiting component after completion of a calibrated duration or upon attaining a calibrated component temperature.

3. The electrical system of claim 1, wherein the at least one sensor includes a first temperature sensor configured to measure an ambient temperature and a second temperature connected to the charge coupler.

4. The electrical system of claim 1, wherein the at least one sensor includes a plurality of temperature sensors each connected to a corresponding one of the power electronic components.

5. The electrical system of claim 1, wherein upon completion of the calibrated duration or attaining the calibrated component temperature, the controller is configured to request a decrease in the requested charging current at a calibrated ramp rate for another calibrated duration or until attaining another calibrated component temperature.

6. The electrical system of claim 1, wherein the power electronic components include a pair of high-voltage contactors.

7. The electrical system of claim 1, wherein the power electronic components include high-voltage bus bars.

8. The electrical system of claim 1, wherein the power electronic components include the charge coupler.

9. A vehicle that is electrically connectable to an offboard charging station during a battery charging process, the vehicle comprising:
    an electric machine operable for delivering torque to a rotatable output member sufficient for propelling the vehicle; and
    an electrical system having:
        a battery pack that is electrically connected to the electric machine;
        a charge coupler configured to connect the electrical system to the offboard charging station via a cable to permit a requested charging current to pass from an offboard charging station to the battery pack during the battery charging process;
        a plurality of power electronic components, including a most-limiting component, wherein the power electronic components are electrically connected to the battery pack and have corresponding temperature-based operating performance information describing a maximum allowed charging current over a plurality of different time intervals, wherein the most-limiting component has a lowest allowed charging current over a respective one of the time intervals;
        at least one sensor operable for determining a temperature of or in proximity to the vehicle; and
        a controller in communication with the at least one temperature sensor and programmed with the temperature-based operating performance data for the power electronic components for a plurality of different component temperatures, wherein the controller is configured to determine the component temperature using the measured temperature, and to request a temporarily increased charging current from the offboard power supply over at least one of the time intervals to thereby supply the battery pack with the maximum allowed charging current of the most-limiting component during the respective time interval.

10. The vehicle of claim 9, further comprising a pair of high-voltage relays disposed on a high-voltage bus bar between the charge coupler and the battery pack, wherein the power electronic components include the pair of high-voltage relays and the high-voltage bus bar.

11. The vehicle of claim 9, wherein each of the power electronic components has a corresponding steady-state charging current that is less than the maximum allowable charging current, and wherein the controller is configured to request the steady-state charging current of the most-limiting component after completion of a calibrated duration or upon attaining a calibrated component temperature.

12. The vehicle of claim 9, wherein the at least one sensor includes a first temperature sensor configured to measure an ambient temperature and a second temperature connected to the charge coupler.

13. The vehicle of claim 9, wherein the at least one sensor includes a plurality of temperature sensors each connected to a corresponding one of the components.

14. The vehicle of claim 9, wherein upon completion of the calibrated duration or attaining the calibrated component temperature the controller is configured to request a decrease in the charging current at a calibrated ramp rate for another calibrated duration or attaining another calibrated component temperature.

15. A method for dynamically adjusting a power limit of an electrical system during a charging process of a battery pack using an offboard charging station, the method comprising:
  measuring an ambient temperature and a temperature of a charge coupler using respective first and second temperature sensors, wherein the charge coupler electrically connects the electrical system to the offboard charging station via a length of cable;
  determining a respective component temperature for each of a plurality of power electronic components of the electrical system using the measured temperatures;
  requesting, via a controller for a calibrated duration at an onset of the battery charging process, a charging current from the offboard power supply that is equal to a maximum allowed charging current of a most-limiting one of the components, wherein the most-limiting component has a lowest allowed charging current over the time interval; and
  after one of passage of a calibrated duration, attaining of a calibrated temperature, or reaching a threshold accumulated charging current, requesting a reduction of the charging current from the offboard power supply to a steady-state charging current of the most-limiting component.

16. The method of claim 15, wherein the requested reduction of the charging current is a discrete step reduction to a level of the steady-state charging current of the most-limiting component.

17. The method of claim 15, wherein the requested reduction of the charging current is a calibrated ramp reduction to a level of the steady-state charging current of the most-limiting component.

18. The method of claim 15, wherein the electrical system includes a pair of high-voltage relays disposed on a high-voltage bus bar between the charge coupler and the battery pack, wherein the components include the pair of high-voltage relays and the high-voltage bus bar.

* * * * *